(12) United States Patent
Denteneer et al.

(10) Patent No.: US 8,787,333 B2
(45) Date of Patent: Jul. 22, 2014

(54) MEDIUM RESERVATION ANNOUNCEMENT

(75) Inventors: Theodorus J. J. Denteneer, Eindhoven (NL); Guido R. Hiertz, Aachen (DE); Bernhard Walke, Wuerselen (DE)

(73) Assignee: Koninklijke Philips N.V., Eindhoven (NL)

( * ) Notice: Subject to any disclaimer, the term of this patent is extended or adjusted under 35 U.S.C. 154(b) by 610 days.

(21) Appl. No.: 12/668,037

(22) PCT Filed: Jul. 10, 2008

(86) PCT No.: PCT/IB2008/052782
§ 371 (c)(1),
(2), (4) Date: Jan. 7, 2010

(87) PCT Pub. No.: WO2009/010905
PCT Pub. Date: Jan. 22, 2009

(65) Prior Publication Data
US 2010/0202417 A1    Aug. 12, 2010

(30) Foreign Application Priority Data

Jul. 17, 2007   (EP) ...................................... 07301244

(51) Int. Cl.
*H04W 4/00*   (2009.01)
(52) U.S. Cl.
USPC ......................................... 370/338; 455/434
(58) Field of Classification Search
USPC .................. 370/312, 329–331; 455/434, 436
See application file for complete search history.

(56) References Cited

PUBLICATIONS

Hiertz et al: "Mesh Networks Alliance (MNA) Proposal IEEE 802.11s-MAC Sublayer Functional Description IEEE.11s-MESH WLAN Security"; Internet Citation, Retrieved From :htfp://www.IEEE802.org/11/docFiles/O5/11-05-0605-02-000s-mesh-networks-alliance-proposal.doc>; Jun. 2005.*
IEEE 802.11 TGS:"Joint See-Mesh/Wi-Mesh Proposal to 802.11 TGS"; Document IEEE 802.11-0610328r0, 119 page Document, Retrieved From the Internet: http://www.ieee802.org/11/DocFiles/06/11-06-0328-00-000s-joint-seemesh-wimesh-proposal-to-802-11-tgs.doc>; Retrieved on Feb. 27, 2006.
Hiertz et al: "Mesh Networks Alliance (MNA) Proposal IEEE 802.11s-MAC Sublayer Functional Description IEEE.11s-Mesh WLAN Security"; Internet Citation, Retrieved From :http://www.IEEE802.Org/11/docFiles/05/11-050605-02-000s-mesh-networks-alliance-proposal.doc; Retrieved on Sep. 28, 2006.

* cited by examiner

*Primary Examiner* — Afshawn Towfighi
(74) *Attorney, Agent, or Firm* — Larry Liberchuk

(57) ABSTRACT

In wireless meshes, mesh points announce reservation of the wireless medium in beacon frame. Each mesh point determines scheduled reservation of the medium for transmission of the future beacon frames and scheduled reservations of the medium for data communication with the station The station further aggregates the reservations into a single element: an medium occupation element and integrates this element into the beacon frame for future transmission to nearby mesh points.

12 Claims, 2 Drawing Sheets

MEDIUM RESERVATION ANNOUNCEMENT

FIELD OF THE INVENTION

The invention relates to a method for announcing reservation of a wireless medium in a wireless network. The invention is particularly relevant to wireless local area networks (WLAN), in particular meshes type of WLAN based on the IEEE 802.11s standard.

BACKGROUND ART

The IEEE 802.11s standardization committee group is currently working on an extension of the 802.11 standard for meshes. The current IEEE 802.11s standard specification, version D1.05, incorporated herein by reference, defines an IEEE 802.11 WLAN using the IEEE 802.11 MAC/PHY layers that supports both individually addressed and group addressed delivery over self-configuring multi-hop topologies. Mesh networks according to the 802.11s standard, or so-called meshes, operate as wireless co-operative communication infrastructures between numerous individual wireless transceivers. A mesh may be centralized or decentralized. Stations or mesh nodes (MP) in the mesh communicate with their neighboring adjacent nodes only and thus act as repeaters to transmit message data from nearby nodes to peers that are too far to reach. Terminology specific to the 802.11s standard will be used in the following paragraphs to illustrate the invention.

By definition, a mesh point MP is an IEEE 802.11 entity that contains an IEEE 802.11-conformant medium access control and physical layer interface to the wireless medium that supports mesh services as defined in the 802.11s standard. Timing of communication over a mesh is of paramount importance to permit efficient communication and prevent conflicts over the medium. The IEEE 802.11 standard and the IEEE 802.11s D1.05 specification propose timing rules that govern communications over the medium and, in particular, mechanisms on how to spread the knowledge of timings from one MP to its neighboring MPs. Because MPs can only communicate with neighboring MPs, information need be spread to at least second level MPs so that most conflicts can be avoided. In meshes, MPs are often engaged in periodic transmissions such as beacon transmissions and/or data communications in reserved time periods. Typically such transmissions are periodically announced in the time domain. These periodic announcements enhance the robustness and reduce competition of MPs for the medium.

Typically, in wireless communication systems, transmissions are vulnerable to interference as simultaneously transmitted frames may collide and corrupt each other. These systems are usually built in with a number of preventive measures to reduce the number of collisions. Examples from the IEEE 802.11 standard include the Carrier Sense Multiple Access with Collision Avoidance (CSMA/CA) and the Request to Send/Clear To Send (RTS/CTS) virtual carried sense protocols.

Medium access problems are exacerbated in systems where the node density is high and where hidden nodes exist. A prime example where such problems likely occur is in mesh networks. A solution to reduce collisions is to advertise MPs scheduled transmissions to other nearby MPs so that the information may be advertised further.

The IEEE 802.11s defines at least two mechanisms to spread timing information to second level peer MPs in the mesh.

The first mechanism concerns the transmission of beacon frames and is defined in section 7.2.3.1 Beacon frame format and section 7.3.2.65 Beacon Timing Element in the IEEE 802.11s D1.05 specification. Section 7.2.3.1 defines the format of the beacon frame that each MP periodically transmits to its neighboring MPs over the medium. A beacon frame includes a beacon timing element that will inform neighboring MPs of the timing of the current beacon frame and future beacon frames with respect to the specific MP. Section 7.3.2.65 gives a possible format for the beacon timing element and more details will follow hereinafter. The beacon timing element is used by an MP to advertise an offset between its timing synchronization function (TSF), or clock, and the mesh TSF. The beacon timing element may also be used to advertise the beacon timing information of the MP's neighbors. By advertising beacon timing information of its neighbors to all its neighbors, timing information may be spread to second level peer MPs. As a result, a given MP will know when to expect beacon transmission by a second level MP with whom it has got at least one common neighbor and will therefore not initiate transmissions with the common neighbor at the indicated time.

The second mechanism is a way to advertise the reservation of the medium by an MP for communication from or to the MP. Section 7.3.2.69 proposes one possible solution and to this respect, defines a so-called MDAOP advertisements element. It is used by an MP to advertise its mesh deterministic access state to its neighbors. The MDAOP advertisement element informs neighbors of when the MP is scheduled to either receive or transmit information data. In addition, the MDAOP advertisements element further includes similar information on MP's neighbors reported scheduled communication over the medium. Again, timing information is spread to at least the second level peers by each MP repeating the timing information on its neighbors as reported by the individual neighbors. Section 7.3.2.69 proposes a possible format.

Although the above mechanisms enhance communication robustness over the medium and prevent conflicts among MPs, a great amount of communication bandwidth is nevertheless dedicated to the spreading of the information. Beacon frames thus tend to be larger in size as the mesh density increases and may end up taking a great part of airtime.

SUMMARY OF THE INVENTION

It is an object of the invention to reduce the size of beacon frames. It is a further object of one or more embodiments of the invention to reduce the overhead in beacon frames.

It is another object of one or more embodiments of the invention to propose an alternative way to increase the awareness of each MPs of the medium reservation by individual MPs.

The invention thus more particularly pertains to a method for announcing reservation of a wireless medium in a wireless network. In the method a station in the wireless network first determines beacon timing information respecting a reservation of the medium for transmission of a beacon frame by the station in the network. It also determines reservation timing information respecting a reservation of the medium for data communication with the station. Then it aggregates the beacon timing information and reservation timing information into an medium occupation element and, transmits the medium occupation element in a beacon frame.

A method of the invention thus proposes to aggregate two timing announcements into a single timing announcement.

For example, in the context of the IEEE 802.11s D1.05, the two timing announcements: the beacon timing element and the MDAOP reservations element, or at least information contained therein, could be combined to create one medium occupation element transmitted in the beacon frame in lieu of the two separate elements. Indeed the two separate elements have similar formats and serve the same purpose, namely informing other MPs that the medium will be busy. The two elements are currently transmitted as separate elements in the beacon frame although both represent periods of time during which the medium will be reserved for communication to or from the mesh point. Even though the medium could be reserved for two different types of communication, beacon transmission or data transfer, both seek to inform neighbors that the medium will be reserved to prevent collisions or conflicts. Whether the medium is reserved for beacon transmission or data transfer may be of secondary interest to an MP.

The inventors have thus realized that beacon frames could be made smaller if the two timing information were combined and aggregated into a single medium occupation element. The medium occupation element would then represent a reservation of the medium for the MP in general whether the reservation concerns the beacon transfer or data transfer. In an embodiment of the invention, the medium occupation element further includes an indicator of whether the medium is reserved for beacon transmission or data transfer.

In an embodiment, the beacon frame further include medium occupation elements with respect to nearby MPs generated in a similar fashion. The medium occupation element with respect to a neighboring MP is thus repeated in the beacon frame of the MP.

An advantage of one or more embodiments of the invention is to allow a more efficient encoding of the overall timing information. Indeed, the format of the medium occupation element need not be identical to the format of the individual reservation information and the aggregation of the two timing elements helps reducing the overhead. For example, 802.11s D1.05 imposes to have the MAC address of a neighboring MP encoded twice in the beacon frame: once for the information of the beacon frame transfer of the MP and once for the information on reservation for data transfer with the neighboring MP. According to the invention, the MAC address may need be mentioned only once in the beacon frame, namely in the medium occupation element of the neighboring station. In another example, two consecutive reservations for the same MP may then be more efficiently encoded compared to the prior art. For example if a MP is scheduled to send a beacon and then immediately thereafter a VOIP message in reserved slot, the MP can advertise these in a combined manner and efficiently, using one entry rather than using two entries.

Another advantage of one or more embodiments is that only one routine is needed to parse and interpret the medium occupation element. Moreover the aggregated medium occupation element is more robust than the prior art formats. The beacon frame is now more compact and consequently commonly known "beacon bloat" can be avoided and thus the risk of dropping out announcements is reduced.

The invention further relates to a station in a wireless network. The station includes a processing unit that determines 1/beacon timing information respecting a reservation of the medium for transmission of a beacon frame by the station and 2/reservation timing information respecting a reservation of the medium for data communication with the station. Once both timings are known the processing unit aggregates the beacon timing information and reservation timing information into a medium occupation element. Then a transmitter of the station integrates the medium occupation element into a beacon frame and transmits the beacon frame.

The invention further relates to a network comprising a plurality of the above stations. The invention also relates to a computer storage medium storing computer executable instructions for carrying the above method.

The foregoing has outlined rather broadly the features and technical advantages of the present invention so that those skilled in the art may better understand the detailed description that follows. One should appreciate that he may readily use the conception and the specific embodiments disclosed as a basis for modifying or designing other structures for carrying out the same purposes of the present invention.

BRIEF DESCRIPTION OF THE DRAWING

For a more complete understanding of the present invention, and the advantages thereof, reference is now made to the following description taken in conjunction with the accompanying drawings, wherein like numbers designate like objects, and in which.

DETAILED DESCRIPTION

Figure 1:
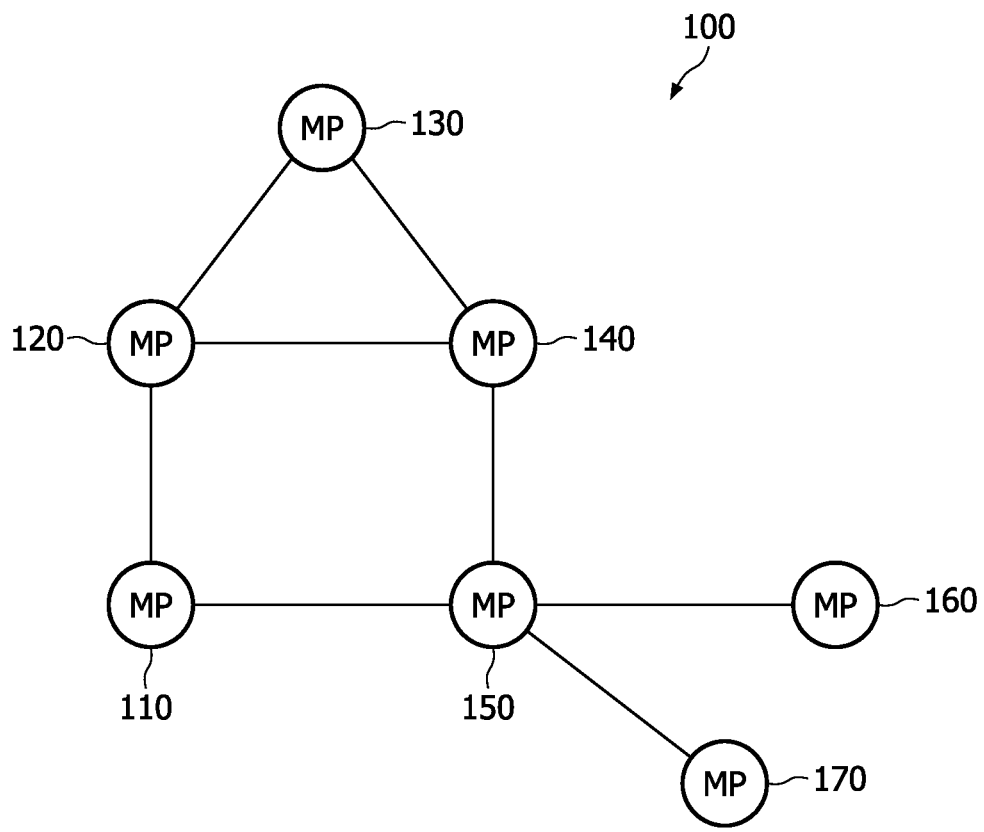
FIG. 1 is a mesh according to the invention.

FIG. 1 shows network 100 of the invention. The invention will be described in the context of wireless meshes and network 100 is a mesh based on the 802.11s D1.05 specification.

Mesh 100 includes mesh points (MP) 110-170. In this embodiment mesh 100 is decentralized, i.e. there is no central controller, and MPs 110-170 communicate using a multi-hop technology where MPs 110-170 may only communicate with nearby MPs that have established a link. Two stations have established a link when they have successfully carried out a link establishment procedure. FIG. 1 shows links set up between MPs 110-170. For example, MP 120 may only communicate directly with MPs 130, 140 and 110 and MP 120 may also communicate with MP 150 indirectly via MP 110 or MP 140.

Once a link has been established between two MPs, MPs 110-170 may communicate with each other during dedicated windows of communications. These windows or periods of time during which a transmitter and a receiver may communicate will be referred to as mesh deterministic access opportunity (MDAOP) as defined in the 802.11s standard, see section 7.3.2.66.

Figure 2:
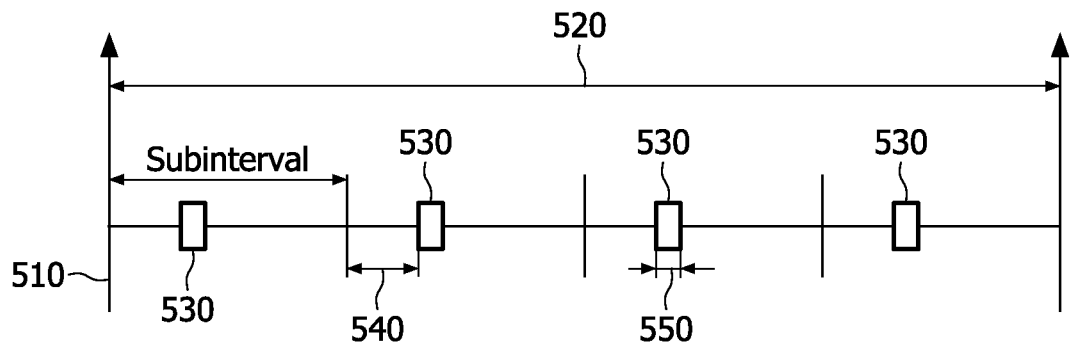
FIG. 2 illustrates a timing diagram of an interval of time between two successive beacon frames.

FIG. 2 illustrates communication timing over the medium for a period of time between two beacon transmissions. As previously mentioned, MP 110-170 transmit periodic beacon frames 510 every DTIM (mesh delivery traffic identification message) interval 520. The value of DTIM interval 520 is conveyed in the beacon timing element of beacon frame 510. In addition, each individual MP 110-170 also informs about the reserved MDAOPs representing reservations of the medium for data communication with the MP, during which the individual MP 110-170 may act as a receiver or transmitter. MDAOPs are granted in sets of individual MDAOPs periodically occurring in the interval 520.

FIG. 2 shows an example of a set of MDAOPs 530 between the individual MP and another MP. The set of MDAOPs was previously negotiated between the two MPs using a handshake protocol defined in 802.11s D1.05. The whole set of MDAOPs 530 may have been requested in a MDAOP Setup Request element (802.11s 7.3.2.66) containing the set ID, the MDAOP duration 550, the MDAOP periodicity, and the MDAOP offset 540 as illustrated in FIG. 2.

Figure 3:
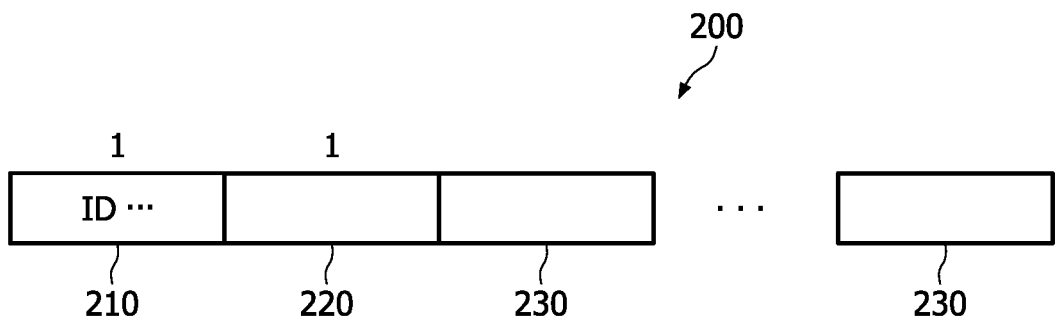
FIG. 3 illustrates the format of an medium occupation element of the invention.

Now referring to FIG. 3, element 200 illustrates a medium occupation element of the invention. As mentioned earlier, element 200 is sent in a beacon frame and represents the aggregated reservations of the medium for the specific mesh point transmitting the beacon. In addition, element 200 may also inform of reservations of the medium by other MPs.

Element 200 is built as follows. It first includes the element ID 210, its length 220 and reservation elements 230 representing reservations of the medium. One element 230 is associated with the MP and other elements 230 may be associated with one of the nearby MPs. Element ID and length element are 1-octet long. One reservation element 230 represents the aggregated reservation for beacon transmission and for sets of MDAOPs allocated to the MP. More details on the format of elements 230 is given in reference to FIGS. 4 and 5.

Figure 4:
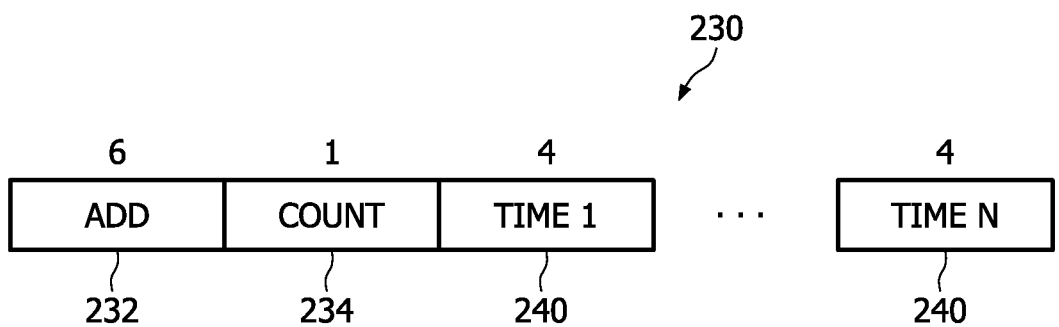
FIG. 4 illustrates the format of a reservation for a mesh point.

In an exemplary embodiment, reservation element 230 may also include reservations of the medium for neighboring MPs. Element 200 contains as many reservations 230 as neighbors have reported scheduled reservations to the specific MP 110-170, in addition to the one reservation element 230 for the specific MP 110-170. The general structure of reservation element 230 is shown in FIG. 4. Reservations 230 with respect to neighbors were acquired from beacon frames received from neighbors. Thus, by having each MP report its own aggregated reservations of the medium to all its neighbors, the information may be conveyed to second level MPs. For example, MP 160 will report its own timing constraints to MP 150 that will repeat the information into a medium occupation element to MPs 110 and 140. The repetition by each MP of its neighbors reservation may be a mere copy of the received reports. MPs 110 and 140 will thus be aware of when the medium is reserved for communication with MP 150 and may be prevented from accessing the medium during the reserved periods.

Figure 5:
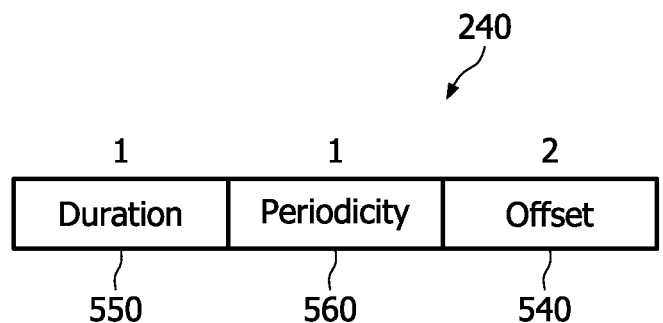
FIG. 5 illustrates the format of an individual medium reservation.

Element 230 contains the MAC address 232 of the MP for which the medium is reserved. It further contains the number N of individual reservations for the given MP and N timing information 240 with respect to each reservation. Each individual reservation corresponds either to a beacon reservation or to a set of periodic MDAOP 230 for an MP as explained previously. Thus, timing information element 240 includes duration 550, periodicity 560 and offset 540 as shown in FIG. 5.

An advantage of the invention is therefore to reduce the overhead of the beacon frame. Currently, announcements for the beacon transmission and data transfers are sent in two separate elements and the formats impose to have the MAC address of each station repeated twice: one associated with the information on the beacon transmission and once for the MDAOP advertisements element. With the invention, the MAC address of each individual MP needs be transmitted once thereby greatly reducing the beacon load. The savings in terms of bandwidth is even higher in dense meshes.

In an alternative embodiment, timing information 240 may further include an indicator on whether the reservation is done for beacon transmission or data transfer. This indicator may be a one-bit indicator.

It is also worth noting that the medium occupation element of the invention may also be transmitted upon request by a MP, e.g. in situations where a new MP joins mesh 100.

What is claimed is:

1. A method for announcing reservation of a wireless medium in a wireless network, the method comprising:
    determining beacon timing information regarding a reservation of the medium for transmission of a beacon frame by a station in the network and reservation timing information regarding a reservation of the medium for data communication with the station;
    aggregating the beacon timing information and reservation timing information into a medium occupation element;
    including the medium occupation element in a plurality of information elements which comprise a beacon frame; and
    transmitting the beacon frame.

2. The method of claim 1, wherein the wireless network is a wireless mesh according to the IEEE 802.11s standard and the station is a mesh point.

3. The method of claim 1, wherein the medium occupation element includes a MAC address of the station.

4. The method of claim 1, wherein the method further comprises:
    receiving a medium occupation element from a nearby station regarding aggregated medium reservation for beacon transmission by the nearby station and for data communication with the nearby station; and
    further transmitting in the beacon frame information on the nearby station's reservations extracted from the medium occupation element of the nearby station.

5. The method of claim 4, wherein the information on the nearby station's reservations is the medium occupation element received from the nearby station.

6. The method of claim 4, further comprising including respective medium occupation elements of all nearby stations in the plurality of information elements in the beacon frame.

7. The method of claim 1, wherein the medium occupation element includes a reservation counter representative of a number of individual reservations of the medium for sets of periodic contiguous periods of time.

8. The method of claim 1, wherein the medium occupation element includes an indicator on whether the individual reservation of the medium concerns a transmission of a beacon frame or a communication with the station.

9. The method of claim 1, wherein the medium occupation element includes one of the following for each individual reservation: a duration, a periodicity and an offset.

10. The method of claim 1, wherein the beacon frame is broadcast to nearby stations in the network.

11. A station in a wireless network, comprising:
    a processing unit configured to determine beacon timing information regarding a reservation of the medium for transmission of a beacon frame by the station and reservation timing information regarding a reservation of the medium for data communication with the station, aggregate the beacon timing information and reservation timing information into a medium occupation element, and include the medium occupation element in a plurality of information elements which comprise a beacon frame; and
    a transmitter configured to broadcast the beacon frame.

12. A wireless network comprising a plurality of stations, each station comprising:
    a processing unit configured to determine beacon timing information regarding a reservation of the medium for transmission of a beacon frame by the station and reservation timing information regarding a reservation of the medium for data communication with the station, aggregate the beacon timing information and reservation timing information into a medium occupation element, and include the medium occupation element in a plurality of information elements which comprise a beacon frame; and a transmitter configured to transmit the beacon frame.

* * * * *